US006856969B1

(12) United States Patent
Hache

(10) Patent No.: US 6,856,969 B1
(45) Date of Patent: Feb. 15, 2005

(54) BI-CURRENCY DEBT CONTRACT SYSTEM AND PROCEDURE

(76) Inventor: Simon Hache, EPSA-170, P.O. Box 02-5256, Miami, FL (US) 33102

( * ) Notice: Subject to any disclaimer, the term of this patent is extended or adjusted under 35 U.S.C. 154(b) by 788 days.

(21) Appl. No.: 09/638,943

(22) Filed: Aug. 15, 2000

(51) Int. Cl.$^7$ ............................................... G06H 17/60
(52) U.S. Cl. .............................. 705/35; 705/36; 705/38; 705/1; 705/14; 340/1; 713/1; 713/150; 902/1; 902/24
(58) Field of Search ............................... 705/35, 1, 14, 705/36, 38; 340/1; 713/1, 150; 902/1, 24

(56) References Cited

U.S. PATENT DOCUMENTS 5,644,727 A * 7/1997 Atkins ........................ 705/40
6,269,347 B1 * 7/2001 Berger ........................ 705/38

FOREIGN PATENT DOCUMENTS

JP           2002166338      *  5/2002    ........... G06F/17/60

OTHER PUBLICATIONS

Siandra, Eduardo "Credit and Moral Hazard in a Dual Currency Economy" May, 2001.*

* cited by examiner

*Primary Examiner*—James P. Trammell
*Assistant Examiner*—John Winter
(74) *Attorney, Agent, or Firm*—Malloy & Malloy, P.A.

(57) ABSTRACT

A bi-currency debt contract system for making secure debts and including guidelines and an associated procedure particularly adaptable for issuing debt of a hard or stabilized currency, such as but not limited to US dollars, to a debtor entity which utilizes the debt proceeds in a secondary economy historically characterized by unstable monetary conditions. A debt issuer entity makes a stable currency debt at a first interest rate, based on a currently available debt rate of the stable currency. An amortization schedule to satisfy the loan is established and is characterized by a portion of the debt being paid at a second interest rate commonly associated with the debt rate of the local currency of the secondary economy, which is significantly greater than the first interest rate. A remainder or second portion of the debt is amortized at the first interest rate on which the debt was also based. A reserve fund is established and retained to facilitate payment or satisfaction of the debt in the event of instability of the secondary economy and/or the inability of the debtor entity to amortize the debt in accordance with the pre-established amortization schedule. The reserve fund is derived from the difference between the higher amortization payment, made at the second interest, and the amount of the lesser payment amortized at the lower first interest rate, at which the debt was actually established.

40 Claims, 2 Drawing Sheets

BI-CURRENCY DEBT CONTRACT SYSTEM AND PROCEDURE

BACKGROUND OF THE INVENTION

1. Field of the Invention

This invention relates to a bi-currency debt contract system including guidelines and an attendant procedure for facilitating the security of debt made in a stabilized currency at an economically attractive interest rate to borrowing entities intending to use the proceeds of the debt in a secondary or historically unstable economy, wherein the debt is satisfied by payment in the stabilized currency and is to a large extent protected from unstable circumstances analogous to a devaluating exchange rate occurring within the secondary economy, by establishing a reserve fund and following other requirements of the bi-currency debt contract system and associated procedure.

2. Description of the Related Art

Even with the continued expansion of a global economy, a significant disparity between the economic stability of developed countries and underdeveloped countries continues to exist. This disparity is commonly demonstrated by the considerable difference in the cost of debt, which is at least partially attributable to the political risk, inflation, fiscal, and monetary policies, devaluation potential and the instability of the local currency in the secondary economies associated with the various underdeveloped countries.

By way of example only, companies in Latin American countries pay a substantially higher borrowing cost than their competitors in the United States and other developed countries. Local banks in such secondary economies must pay a substantially higher interest rate to depositors in their countries in order to keep the depositing clients from changing their assets from the local currency to US dollars or other hard currencies. Therefore, borrowers at the local banking institutions have to pay their loans at a much higher interest rate than in the United States or other countries enjoying low political risks, stable economies, sound fiscal and monetary policies and reliable and a stable currency.

In addition to the above there is usually the fear of accelerating devaluation as occurred in the two Mexican crisis of 1985 and 1994, which were universally recognized as the result of inappropriate economic policies. This type of economic instability is frequently present in underdeveloped countries even when the local currency thereof is relatively stable. The result, as set forth above, is a constant and significant difference in the cost of capital in the secondary economies and the more stable economies of the developed countries.

Because of the differences in the cost of debt and therefore the cost of doing business, a number of companies or other borrowing entities associated with the economies of an underdeveloped country are often times willing to take the risk of indebtedness at a lower interest rate in a stable currency, such as but not limited to the US dollar. Further by way of example, the difference in borrowing costs may be between a 9.5% lending rate in US dollars versus a 22% lending rate in the local currency of a secondary economy, such as the Dominican Republic. The obvious attraction to the borrowing entity is the significant decrease in the cost of the borrow money. The willingness to assume risks by those borrowing US dollars, or other hard currencies, is usually more prevalent during periods of relative economic stability in the related secondary economy, when the local currency is stable versus the US dollar. More specifically, companies may be willing to take the risk of devaluation of the local currency, which typically is the result of an occurrence of an economically unstable event for period time.

However, when severe devaluation does take place, a company or other borrowing entity that has assumed loans in US dollars are suddenly faced with substantially higher debt payments, in terms of their local devalued currency, even when inflation increases local prices. This inflationary rise in prices most often does not offset the increased obligations of the borrowing entity that must be met in US dollars, which ultimately is paid for in local currency converted to US dollars using a new, devalued exchange rate. Therefore, the risks of occurring debt in a hard or stable currency at a lower interest rate are realized when an economy suffers a rapid devaluation of the local currency, inflation and/or a contraction of economic growth. The resulting economic damages to the borrowing entity are normally defaulting or renegotiating loans made in the stable currency or the bankruptcy of the business or venture associated with the borrowing entity. In addition to the above and perhaps most, importantly, because of the above described "devaluation risk of the exchange rate", financial institutions in the United States and other developed countries do not want to finance, through loans, numerous commercial ventures in countries characterized by high interest rates for local currency loans. As a result lending institutions in developed countries which deal in stable currencies, such as the United States, have a tendency to ignore a significant portion of the short and long term debt market.

When issuing any form of debt operation, the interest rate charged should reflect the risk involved in the business. As a further example, if one borrows US dollars but invests in a project in Mexican pesos, the risk involved should reflect the risk of doing business in the Mexican economy rather than the lower cost of borrowing a stable currency from a fundamentally sound economy. This mistake is commonly made when a loan is secured in a stable currency because the interest rate charged are lower, the borrowing entity taking the devaluation risk, calculates that it can assume business or commercial projects with relatively low opportunity costs of capital. When borrowing entities of this type prepare a profitability analysis using interest rates of developed countries which deal in a stable currency, conventional financial tools including "net present value" and "internal rate of return" are used. However, when the cost of doing business or making a loan is determined in terms of the lower cost of borrowing a stable currency, the results do not reflect the true financial and economic risks involved in the event of the occurrence of an unstable event in the secondary economy.

Normally the high interest rate in a local currency reflect the risk of doing business in that country. Risks, issuing debt, inflation expectations, political and economic stability are common factors affecting real rates of interest in underdeveloped countries. Accordingly, when a company borrows in order to invest in a project or business, the debt currency is normally the same as the currency invested. That is if a company borrows in Mexican pesos the money is invested in a Mexican business. The cost of issuing any debt reflects the risk of business in the local currency of that country. If a company is importing goods from the United States to Mexico and borrows Mexican pesos in order to buy dollars to pay the foreign supplier at the peso interest rate of any type of debt, that company is taking the exchange rate risk into consideration with respect of the US dollar. However, if devaluation occurs it would most likely cause an increase in the Mexican prices. The devaluation will probably result in sufficiently higher prices to off-set the devaluation cost that the Mexican company is paying in the higher debt costs of the Mexican interest rate. The Mexican company must calculate its profitability calculations with the Mexican interest rate, there by more accurately reflecting its "net present value" and "internal rates of return".

Based on the factors and risks involved in any type of debt in stable currencies from developed countries for use in secondary or unstable economies, there is a significant need for a unique bi-currency debt contract system which overcomes the well recognized problems and disadvantages of the type set forth above. Such an improved system should comprise a bi-currency debt contract and/or procedure for issuing debt in a stabile currency, in a manner which protects both the debt issuer and borrower particularly when the proceeds of the debt are to be used in an underdeveloped country and/or secondary, potentially unstable economy.

SUMMARY OF THE INVENTION

The present invention is directed towards a system for issuing secure debt and includes a bi-currency debt contract system and an associated procedure. More specifically, the bi-currency debt contract system of the present invention is specially adaptable for issuing any type of debt in a stabilized or "hard" currency, which normally represents the national currency of a developed, stable government practicing safe fiscal policies. Moreover the bi-currency debt contract system and procedure of the present invention is specifically, but not exclusively, designed for issuing any type of debt of stable currency to borrowers and/or borrowing entities that will utilize the debt proceeds in underdeveloped countries or what may be referred to as a secondary economy. The term "secondary economy" is meant to describe various economies throughout the world, which are normally associated with underdeveloped countries and which historically have a potential for fiscal and monetary instability, including inflation, devaluation, political instability, etc. Because of the aforementioned economic instability the underdeveloped countries are confronted with a considerable difference in the cost of debt in the local currency associated with the secondary economy, from the cost of debt in a stable currency, from a developed country. The high interest rates attached to debt made in a local unstable currency, reflect the risks in that country of the aforementioned unstable conditions which are common factors affecting, the interest rates in such underdeveloped countries.

Numerous borrowers and/or borrowing entities present or doing business in secondary economies of the type as set forth above are credit worthy, and of course recognize that the lending interest rate for issuing any type of debt in a stable currency is significantly less than the higher interest rates for issuing any type of debt in a local currency in the country or region in which they are doing business. As a further example, the difference in borrowing costs may be approximately 9.5% in US dollars versus a 22% lending rate in a local currency, such as the Dominican pesos of the Dominican Republic. Such lower interest rates of stable currency loans is of course very attractive to a business, particularly in times of economic stability in the underdeveloped country or secondary economy associated therewith. In such times, the local currency is stable versus the American dollar and many borrowing entities may be willing to take the "devaluation risk". However, the bi-currency debt contract system and procedure of the present invention overcomes a potentially disastrous result when a crisis or period of instability occurs within the secondary economy of the underdeveloped countries. During such crisis situations, it is typical for the local currency to be devalued, inflation to be rampant and the overall commercial or economic base of the underdeveloped country to contract. Accordingly, companies or other borrowing entities that have indebted themselves in US dollars or other stabile currencies, suddenly face a substantially "higher" debt payment since the company or borrowing entity in the secondary economy is most probably doing business in local currency. While the inflationary environment persists in the secondary economy, local prices increase but commonly do not offset the increased value of the debt obligation in light of a new devalued exchange rate, between the local currency and stabile currency in which the debt was consummated. In addition, a secondary economy suffering from rapid devaluation and inflation together with a contraction of the demand for goods and services, collectively affect the debtor entity. Therefore, under such conditions it is common for a debt, existing in the stabile currency, to be defaulted or re-negotiated or, alternatively the business or borrowing entity declares bankruptcy. As a result of the above, debt issuers in developed countries which enjoy a stable currency and strong economy are reluctant to assume the devaluation risk associated with granting debtor entities in secondary economies, a stable currency debt. Accordingly a significant segment of the potential debt market is lost to such debt issuers which deal in a stable currency. Therefore, in utilizing the bi-currency debt contract system and procedure of the present invention debt issuer institutions dealing in a hard or stable currency and willing to issue debt at a first, relatively low interest rate can significantly expand their financial services and markets to secondary economies having a normally high debt interest rate and a substantially low or minimum devaluation risk of the exchange rate.

The debt contract system of the present invention comprises a bi-currency contract and associated procedure, wherein a debt issuer entity dealing in a stable currency enters into a debt agreement with a debtor entity for use of the debt proceeds in an underdeveloped country or secondary economy. Further, the debt agreement stipulates that the principle of the debt will be paid to the debtor entity in a predetermined stable currency, such as US dollars, and the debt will be satisfied in the same stable currency. However, one feature of the present invention is the creation of a reserve fund for the purpose of facilitating satisfaction of the debt or more specifically partial satisfaction or payment of an amortization schedule agreed upon for the satisfaction of the debt. The aforementioned devaluation risk, which may result upon the occurrence of periods of instability in the secondary economy, is significantly reduced or eliminated since the principal of the reserve fund will be used to make up for any deficiencies or inability of the debt entity to make the payments in accordance with the amortization schedule.

As a further example, a company in the Dominican Republic has a commonly available lending interest rate of 22% whereas in the United States the commonly available lending interest rate may be at a significantly reduced rate of 101. The company or borrowing entity wants to take advantage of the lower interest rate in the United States and thereby increase its profit. Accordingly, the borrowing entity in the secondary economy enters into a debt agreement with the debt issuer entity in the United States or other secure economy based entity, wherein the debt issuance is established at a cost equal to or at least partially based on the commonly available interest rate in the United States. However, for purposes of establishing the aforementioned reserve fund a portion of the outstanding debt is amortized, by either a one time payment or a plurality of periodic payments, payable in US dollars, at the higher, local interest rate commonly available in the secondary economy.

The reserve fund is thereby derived from the difference between the higher amortization payment, made at the higher interest rate associated with the secondary economy and the amount of the lesser payment, amortized at the lower interest rate associated with the stable currency and at which the debt was actually established. The amount of the reserve fund will be predetermined and based on a number of factors including historical and current economic factors which affect the stability of the secondary economy as well as the size of the debt. Therefore, the reserve fund is established to protect both the debt issuer and debtor against the hardships resulting from severe devaluation of the local currency and contraction of the local economy by proper structuring of the amortization schedule. The amortization schedule could typically require the first 9 or 10 monthly payments, on a ten year debt, to be made to the debt issuer entity at the higher interest rate commonly associated with the secondary economy. The excess money between the payments at the higher interest rate and the amount of payment which would be due at the lower interest rate and at which the debt was actually established, will be accumulated to build the aforementioned reserve fund to the point where the devaluation risk has been significantly reduced or eliminated in the event of economic instability or crisis occurring in the secondary economy. On a ten year loan amortized by monthly payments, a first debt service can comprise the first 9 or 10 months amortized at the higher interest rate associated with the secondary economy. Thereafter, the agreed upon amortization schedule can define a second debt service comprising a plurality or monthly or other periodic payments amortized at the lower interest rate at which the debt was truly established. It is to be emphasized that the length of the first debt service, in terms of monthly payments amortized at the higher interest rate associated with the secondary economy, may vary and is of course not limited to the nine or ten monthly payments, as indicated above. However, it is also to be emphasized that the safest application of the bi-currency debt contract system and procedure of the present invention includes a debt service of sufficient length or being defined by a sufficient number of monthly payments, at the higher interest rate associated with the secondary economy, to overcome a "worst case" scenario in terms of the occurrence of a financial crisis. The bi-currency debt contract system and associated procedure of the present invention also contemplates a situation where the first debt service lasts over almost the entire length of the debt. More specifically, the first debt service could comprise a plurality of periodic or monthly payments, amortized at the higher interest rate of the secondary economy and lasting over a majority, if not all, of the monthly payments until the debt is satisfied. Upon satisfaction of the debt, or at some predetermined point prior to the debt conclusion, the amount of the reserve fund is returned as profit to the debtor entity.

As part of any and all of the above scenarios, the difference in the amount of payments between amortizing the debt over the first or higher interest rate and the second or lower interest rate, serves to create the aforementioned reserve fund. However, regardless of the size of the reserve fund created, the amount of the reserve fund is eventually returned to the debtor entity as a financial benefit or profit, either periodically over the coarse of the debt or at the end thereof, as may be predetermined and negotiated between the debtor entity and the debt issuer entity when the debt is established.

The debt system, including the bi-currency debt contract system and procedure of the present invention, as described in greater detail herein, may also significantly reduce or eliminate the requirement for a security deposit normally demanded by debt issuer entities in developed countries from the debtor entity associated with undeveloped countries, wherein the security deposit is typically equal to 100% of the amount of the debt. The reduction or elimination of such a large security deposit will no longer be necessary since the devaluation risk has been significantly reduced or eliminated by the establishment of the reserve fund. Therefore the liquid assets normally assigned to fund the 100% security deposit are not needed.

When considering or determining the credit worthiness of a debtor entity, utilizing the bi-currency debt contract system and procedure of the present invention, a credit analysis should be based on the normally higher debt interest rate of the local currency of the secondary economy with which the debtor entity is involved. In addition, a profitability schedule of the benefit of the debtor entity can be determined when establishing the debt in the stable currency at a significantly lower debt interest rate.

Yet another scenario which is incorporated within the spirit and scope of the present invention includes the possibility of a debt issuer entity, dealing in a stable or hard currency and willing to provide loans at a relatively low debt interest rate, does so to a debtor entity within a secondary economy at a somewhat higher debt interest rate or "mark-up" in fees, etc. This scenario exists primarily when there is a minimum risk of a devaluation of the exchange rate, between the stable currency and the currency of the secondary economy, based at least in part on historical as well as current political and economic conditions of the secondary economy.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
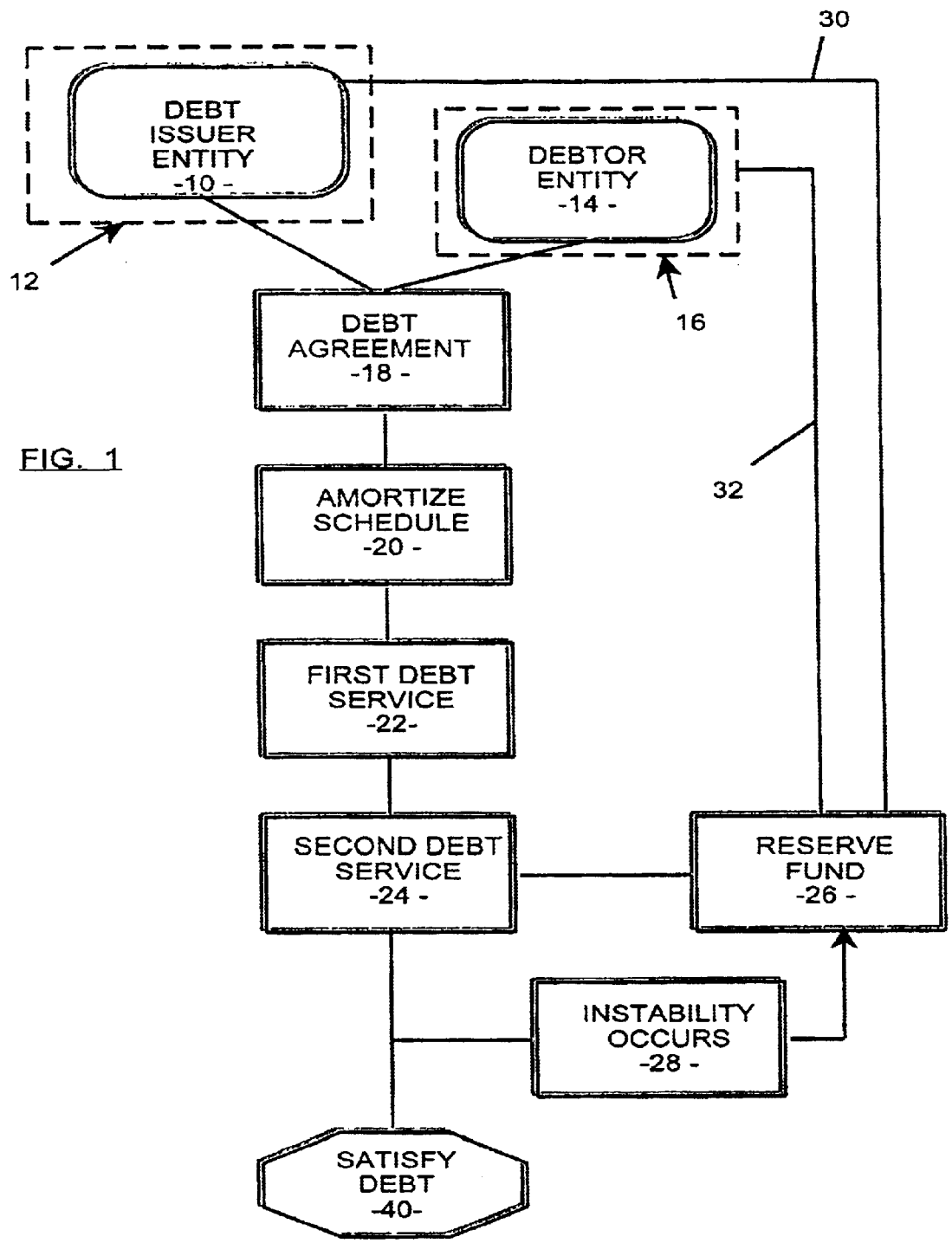
FIG. 1 is a schematic representation in flow chart form of at least one embodiment of the bi-currency debt contract system and procedure of the present invention.

The present invention is directed towards a bi-currency debt contract system and a procedure associated therewith for establishing secure debts between a debt issuer entity and a debtor entity, in a stable currency, wherein the proceeds of the debt are to be used in a secondary economy. For purposes of clarity reference will be made to one or more examples wherein the stable economy is represented as US dollars, the debt issuer entity is located in or associated directly with the United States, the secondary economy is that associated with the relatively underdeveloped country of the Dominican Republic and the local or national currency of the secondary economy is represented in Dominican pesos. It is emphasized however, that the system and procedure of the present invention are not limited to a specific developed country, stable currency, secondary economy or local or national currency associated with the secondary economy. Further, the bi-currency debt contract system and associated procedure of the present invention may also be applied to debt situations which are not necessarily between a debt issuer entity associated with a stable currency and a debtor entity associated with a secondary economy, as will be explained in greater detail hereinafter.

With reference to the accompanying Figures, a debt issuer entity generally indicated as 10 is located in a developed country such as, but not limited to, the United States and generally indicated as 12, wherein debts are typically made in US dollars. A debtor entity, generally indicated as 14, is located or directly associated with a relatively underdeveloped country, such as the Dominican Republic comprising a secondary economy, as explained in greater detailed herein. Both the underdeveloped country and the secondary economy are collectively represented as 16. Further by way of example the commonly available debt interest rate for credit worthy debtors will be defined as a first interest rate and will be generally referred to as 10%. To the contrary, due to the historical economic instability of the underdeveloped country and the secondary environment 16, the commonly available interest rate is 22% and will hereinafter be referred to as the second interest rate.

The debt issuer entity 10 and the debtor entity 14 enter into a debt agreement as at 18. An important part of the debt agreement 18 is that the resulting debt between the debt issuer entity 10 and the debtor entity 14 will be made in the stable currency or US dollars associated with the developed country 12. Similarly, the debt will be re-paid or satisfied by the debtor entity 14 in the same stable currency. As a further part of the debt an amortization schedule 20 is established and agreed upon. In accordance with the established amortization schedule 20, satisfaction of the debt may be made in accordance with what may be generally referred to as a first debt service 22 and a second debt service 24 respectfully.

As set forth above, in order to protect both the debt issuer entity 10 and the debtor entity 14 against a devaluation risk associated with the economic instability of the secondary economy 16, particularly when the debt is issued and intended to be satisfied in the stable currency of the developed country 12, a reserve fund is established as at 26 in order to aid the debtor entity 14 in the satisfaction of the debt or otherwise helping or facilitating satisfaction of the agreed upon amortization schedule, including the one or more payments associated with the first debt services 22 and the one or more payments associated with the second debt service 24. The reserve fund 26 is intended to be accessed upon the occurrence of economic instability, generally indicated as 28 or other economic factors which derogatorily affect the ability of the borrowing entity 14 to make the one or more payments associated with either the first debt service 22 or the second debt service 24.

Accordingly, upon the occurrence of a crisis event or a period of economic instability 28, the reserve fund 26 will be accessed and paid, as at 30, to the debt issuer entity 10 in whole or in part, as needed, in order to accommodate the amortization schedule 20. More specifically, each or a portion of each of the payment or payments defining the first debt service 22 or the second debt service 24, provided in the amortization schedule 20, may be satisfied by the reserve fund or a proportionate amount thereof as needed. However, when the debt is completely satisfied as at 40, without the occurrence of economic instability 28 and provided that the borrowing entity 14 is able to perform in terms of the amortization schedule 20 as provided by the first debt service 22 and the second debt service 24, the reserve fund 26 will be returned to the debtor entity 32 as a financial benefit or profit. The debtor entity 14 is thereby given the benefit of the full financial advantage of establishing a stable currency debt at a significantly reduced first interest rate, while at the same time eliminating the devaluation risk of the exchange rate to both the debt issuer entity 10 and the debtor entity 14.

Because of the important protective features offered by the establishment of the reserve fund 26, the accumulation of moneys from which the reserve fund is derived is important. It will be recalled that the debt agreement 18 specifically called for the debt to be issued by the debt issuer entity 10 to the debtor entity 14, in the stable currency, such as US dollars. Similarly, at least one embodiment of the debt system of the present invention provides that the debt agreement 18 establishes that the satisfaction of the loan will be made in the same stable currency. Importantly, the debt of stable currency will be established at an agreed upon relatively low first interest rate, at least partially based on a commonly available debt interest rate of the stable currency within the developed country or stable economy 12. However, the credit analysis of the debt should be also based on the high second interest rate of a local currency of a secondary economy. Since the terms of the debt should comply with the debtor entity's ability to repay the debt within the local economic conditions of the secondary economy.

In accordance with the example that was outlined above, the first interest rate would be represented as 10%. However, in order to accumulate sufficient funds to facilitate satisfaction of the debt, as at 40, even upon the occurrence of periods of economic instability 28 within or affecting the secondary economy 16, the amortization schedule creates what may be generally referred to as the first debt service 22. The first debt service requires a single payment or alternatively, a plurality of periodic payments to be made at a second interest rate. The second interest rate is at least partially based on a commonly available interest rate for debts in the local currency of the secondary economy 16. The representative second interest rate would be 22%.

Therefore, the accumulation of sufficient moneys to complete the reserve fund 26 would be based on a first debt service 22 comprising one or a plurality of periodic payments based on amortization of the debt at the second, higher interest rate. The reserve fund is then derived from the difference between the higher payment, amortized at the higher second interest rate and the amount of a lesser payment amortized at the lower first interest rate, at which the debt was actually established. When the amount of the reserve fund reaches a predetermined value, the amortization schedule 20 provides for the instigation of the second debt service which most preferably is in the form of a plurality of periodic payments, which will amortize the remaining portion of the debt at the lower, first interest rate which, as set forth above, was the true interest rate at which the debt was established. Accordingly, during the payment of the first debt service 22, the amount of a monthly, payment associated therewith which is equal to an amortization payment at the lower, first interest rate, will be applied to the debt. The excess money, or the difference between the payment amortized at the first interest rate and the greater amount or payment amortized at the second interest rate will be attributable directly to the reserve fund.

As set forth above the amount of the reserve fund should be predetermined and be sufficient to facilitate satisfaction of at least a portion of the amortization schedule, comprising either the first debt service or second debt service. Determination of the actual amount of the reserve fund should be based at least partially on the amount of the debt and the stability of the secondary economy. Further, in determining the economic stability of the secondary economy, both historical and current economic conditions must be considered. However, the bi-currency debt contract of the present invention suggests 9 to 10 monthly loan payments, as described in greater detail herein, since it is meant to cover the worst possible scenario and thereby provide added safety to both the debt issuer and debtor entity. For example, the amortization schedule can typically provide for a ten year debt amortized over a plurality of periodic payments, such as monthly payments, wherein approximately the first ten monthly payments would be based on the amortization of the debt at the second, higher interest rate. Upon the establishment of the predetermined amount in the reserve fund 26, the remainder of the monthly payments would be based upon an amortization of the debt at the lower, first interest rate, which is the true interest rate at which the debt was originally established.

To further illustrate the advantages of the lending system of the present invention an approximate exchange rate between Dominican pesos and U.S. dollars of 16.5 to 1, will be assumed. The example will further assume a cost of borrowing at the low first interest rate of 10% of the stable currency and a second high monthly payments. The monthly payment at 10% first interest rate is US$212,470.45 compared to US$276,189.12 at the 22% second interest rate. A difference of 29.99%, or US$63,718.67 per month thereby exists. The higher monthly payment amount is continually paid for a predetermined number of payments (first debt service), until the total amount of the reserve fund has been established, even though the local currency exchange rate and economic conditions of the secondary economy remain stable. Thus, the monthly difference of US$63,718.67 ($276,189.12 minus $212,470.45) is used to establish the reserve fund. The amount of the reserve fund becomes an additional benefit or "profit" to the borrowing entity if the reserve fund is never utilized, since the reserve fund is returned to the borrowing entity, if the secondary economy remains stable. The lending model and procedure of the present invention converts the devaluation risk of the exchange rate between the first interest rate of a stable economy and the second interest rate of a secondary economy into generally additional financial benefits and/or profits to the borrowing entity.

Other factors to be included in the bi-currency debt contract and procedure of the present invention comprise a variation in the number of payments of the first debt service, as well as when the amount of money accumulated in the reserve fund is returned in whole or in part to the debtor entity. Such factors may differ, dependent on the circumstances of each debt and may be predetermined and negotiated at the time the debt is established.

It should also be emphasized that payment of the first debt service can be made in a single payment rather than a plurality of periodic payments. When a single payment is made to satisfy the first debt service 22 the difference in the amount of the payment between amortizing the debt at the second, higher rate and at the first, lower interest rate would be the basis from which the reserve fund 26 is derived. Alternatively, the bi-currency debt contract system and procedure of the present invention also contemplates a scenario wherein the first debt service, comprising 3 a plurality of periodic payments at the second or higher interest rate, lasts over at least a majority, if not the entire debt. At the end of the debt or at some predetermined point prior to the debt being satisfied, the resulting reserve fund or a portion thereof is returned to the debtor entity as profit. The debt system including the bi-currency debt contract and procedure of the present invention also includes an additional modification of this embodiment. More specifically, the additional modification comprises the pre-established or pre-negotiated amount of the reserve fund being paid as a single payment by the debtor entity. The debt would then be amortized over a plurality of monthly or other periodic payments, all at the second higher interest rate for the life of the debt, in accordance with the first debt service as set forth above. The excess money accumulated due to the debtor entity 14 paying all of the periodic payments at the second higher interest rate would eventually be returned as would the unused reserve fund, to the debtor entity, upon satisfaction of the debt or at another pre-negotiated time. An advantage to the debtor entity would be the ability to deduct the second higher interest rate payments over the life of the debt as a tax deduction or a business expense. It is again to be emphasized that the reserve fund whether established from a plurality of payments, defining the first debt service, or by a single payment in the agreed upon amount of the reserve fund, would be returned to the borrowing entity at an agreed upon time, preferably at the satisfaction of the debt. Also, in either of the above embodiments, significant tax deductions would be a benefit to the debtor entity. This is because all of the periodic payments, regardless of when or how the reserve fund was established, would be made at the second higher interest rate. The amount of the higher interest rate on the debt would of course result in a higher tax deduction.

Figure 2:
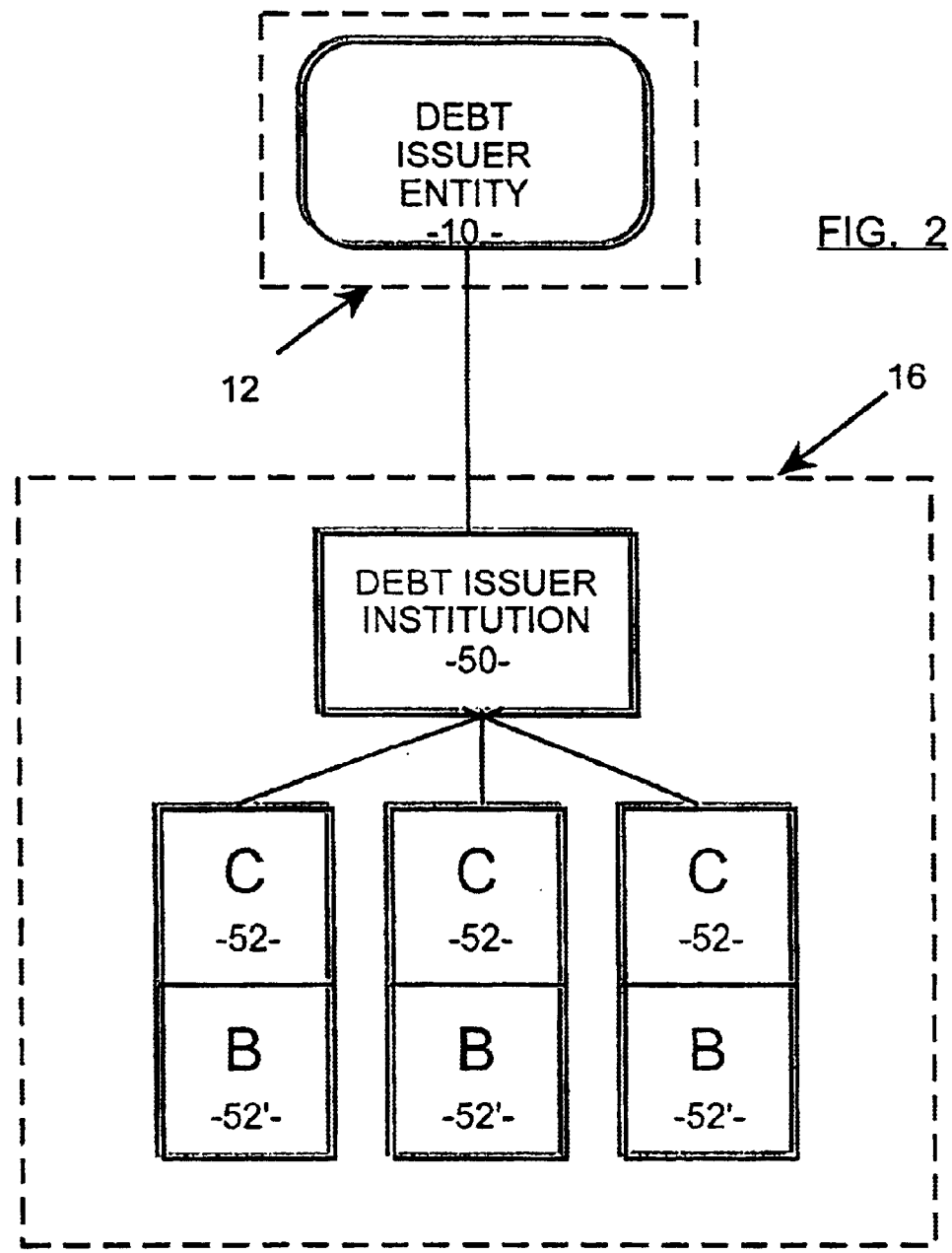
FIG. 2 is a schematic representation in flow chart form of at least one other embodiment of the bi-currency debt contract system and procedure of the present invention.

In another embodiment of the present invention, at least partially shown in FIG. 2, a slight difference may arise from the embodiment of FIG. 1. As shown, the debtor entity may be one or more banks or other debt issuer institutions 50 located within or directly associated with the secondary economy 16. However in this embodiment, the debt issuer entity 10 issues debt directly to the one or more debt issuer institutions 50, at the lower first interest rate. In turn, the local banks establish debts to customers 52 in the local currency and at the local higher debt interest rate, referred to above as the second interest rate. Such a modification would provide the lending entity 10 with the benefit of a wider market and greater rate of expansion in that the one or more debt issuer institutions 50 within the secondary economy 16, would have the effect of utilizing an already existing distribution network by underwriting debts to existing and/or readily available clients, as at 52. The local debt issuer institution 50 would have a greatly increased profit base in making or under writing debts to their clients 52 in that local bank or debt issuer institution 50 frequently borrow from local savings and loan institutions, utilizing the local currency. Naturally, in such a situation, the debt issuer institutions 50 would normally borrow at a significantly higher, commonly available debt rate when borrowing from the local savings and loan institution. By borrowing from the debt issuer entity 10 the debt issuer institutions 50 would not only enjoy the benefit of receiving the debts in a stable currency but would enjoy the significantly less interest rate, referred to above as the lesser, first interest rate. More specifically, the local debt issuer institution 50 will obtain the amount of the debt from the debt issuer entity 10 at a significantly reduced rate. The debt issuer institution 50 would then make one or more loans to local customers 52, in the local currency and at the significantly higher local debt interest rate, referred to above as the second interest rate. The one or more customers 52 would satisfy their respective debts to the debt issuer institution 50 in the local currency and at the significantly greater second interest rate. The lending institutions 50 would thereby make additional and significant profits from the difference in the first interest rate at which the money was originally borrowed, from the debt issuer entity 10, and second interest rate at which the debt was issued out to the plurality of customers 52.

Yet another embodiment of the debt system, including the bi-currency debt contract and procedure of the present invention, is further demonstrated in FIG. 2, wherein one or more local debt issuer institutions 50, located in a secondary economy 16, would make available a variety of clients 52 interested in obtaining low interest debts, in a stable currency such as a US dollars. Accordingly, the debt issuer institutions 50 would make their respective clients 52 directly available to the debt issuer entity 10 and thereby make each of the client's 52 a debtor entity, or a client/debt issuer as at 52'. The value or economic advantage to the debt issuer institutions 50 would be in the form of a compensation package which would comprise an issuance fee, paid by the debt issuer entity 10 for compensation in offering its client's 52, 52' to the debt issuer entity 10. Also the compensation package would include the debt issuer institution 50 earning all the fees involved in converting the local currency, such as Dominican pesos, received as revenue by the client/borrower 52, 52' into US dollars. In addition, such a compensation package could include any interest derived from depositing the established reserve fund 26, as described with reference to the bi-currency debt contract system of FIG. 1, into the respective one or more of the debt issuer institutions 50. All of the above fees and/or forms of compensation could be negotiated so as to be economically feasible for the local debt issuer institutions 50 and the debt issuer entity 10.

Yet another embodiment of the debt system of the present invention comprises the converting or swapping of pre-existing debts issued by one or more of the debt issuer institutions 50 into stable currency debts in accordance with the bi-currency debt contract system and procedure of FIG. 1. This situation would be economically feasible to the banks or other types of debt issuer institutions 50 as long as the mark up of the local debt is less than the commissions and fees that the local debt issuer institution 50 would earn when utilizing the subject bi-currency debt contract system and procedure, as explained primarily with regard to FIG. 1. If the aforementioned commissions and fees would be sufficient, it would then be feasible for the debt issuer institution 50 to convert or swap the previously established debts with the stable currency debts incorporated within the bi-currency debt contract and procedure of the present invention.

Yet another embodiment and/or modification of the bi-currency debt contract and procedure of the present invention comprises the application thereof for short term debts. When the debt is a short term debt, it is established at a first interest rate, as set forth above, plus a "premium interest" which serves as an additional assurance and protection for both the debt issuer entity and the debtor entity that the occurrence of a financial crisis and/or devaluation of the exchange rate will not affect the satisfaction of the debt within the short term of its duration. These additional protections or assurances are provided since the length of the debt may or may not be adequate to establish a sufficient reserve fund in the manner set forth above.

Regardless of the various scenarios used in applying the bi-currency debt contract system and procedure of the present invention, an additional benefit to both the debt issuer and debtor entities is the establishment of various profit or benefit schedules representing the difference between the first and second interest rate payments, for long term debt. In addition, a cost benefit analysis for short term debt may be provided. The similar schedule or cost benefit analysis may be provided when the reserved fund is based on a one payment option, instead of the first and second debt service being respectively amortized over a plurality of periodically or monthly payments.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A bi-currency debt contract system for making stable currency debts for use in secondary economies, said bi-currency debt contract system comprising:
   a) a debt issuer entity having access to at least one stable currency,
   b) a debtor entity having use for debt proceeds in a secondary economy,
   c) a first interest rate at least partially determined from a commonly available debt interest rate database of the stable currency,
   d) a second interest rate at least partially determined from a commonly available interest rate database of a local currency of the secondary economy,
   e) an agreement for a debt between said debtor and debt issuer entities at said first interest rate, said debt payable in the stable currency, and
   f) a processor assembly structured to generate an amortization schedule, said amortization schedule comprising a first debt service obligation payable at said second interest rate and a second debt service obligation payable at said first interest rate.

2. A bi-currency debt contract system as recited in claim 1 wherein said debt is satisfied by payment in the stable currency.

3. A bi-currency debt contract system as recited in claim 2 further comprising a reserve fund of sufficient amount to facilitate satisfaction of said amortization schedule in the event of a period of instability of said secondary economy.

4. A bi-currency debt contract system as recited in claim 3 wherein said reserve fund is derived from the difference in the amortization of the debt at said second and first interest rates, said second interest rate being greater than first interest rate.

5. A bi-currency debt contract system as recited in claim 1 further comprising a reserve fund of sufficient amount to facilitate satisfaction of said amortization schedule in the event of a period of instability of said secondary economy.

6. A bi-currency debt contract system as recited in claim 5 wherein said reserve fund is derived from the difference in the amortization schedule at said second and first interest rate.

7. A bi-currency debt contract system as recited in claim 5 wherein the amount of said reserve fund is predetermined based at least partially on the amount of said debt and the stability of said secondary economy.

8. A bi-currency debt contract system as recited in claim 7 wherein said stability of said secondary economy is based on historical and current economic factors.

9. A bi-currency debt contract system as recited in claim 7 wherein said reserve fund is established as an initial deposit.

10. A bi-currency debt contract system as recited in claim 5 wherein said reserve fund is accumulated from a portion of said periodic payments of said first debt service obligation.

11. A bi-currency debt contract system as recited in claim 10 wherein said periodic payments of said first debt service obligation continues for a predetermined length of time until said reserve fund comprises a predetermined amount.

12. A bi-currency debt contract system as recited in claim 10 wherein said predetermined amount of said reserve fund is based at least partially on the amount of said loan and the instability of said secondary economy.

13. A bi-currency debt contract system as recited in claim 12 wherein said second debt service obligation begins upon the satisfaction of said first debt service obligation and said reserve fund comprising a predetermined amount.

14. A bi-currency debt contract system as recited in claim 13 wherein said reserve fund is retained by said debt issuer entity and applicable to satisfy at least a portion of said second debt service obligation during a period of instability of said secondary economy.

15. A bi-currency debt contract system as recited in claim 14 wherein said reserve fund is retained by said debt issuer entity and applicable to satisfy at least a portion of either said first or second debt service obligation during a period of instability of the secondary economy.

16. A bi-currency debt contract system as recited in claim 15 wherein any unused portion of said reserve fund is returned to said debtor entity upon satisfaction of said loan.

17. A bi-currency debt contract system as recited in claim 13 further comprising a security deposit payed by said debtor entity in an amount less than the amount of said debt.

18. A bi-currency debt contract system as recited in claim 13 wherein said debt issuer entity is associated with a debt issuer institution directly associated with said secondary economy and said debtor entity is a client of said debt issuer institution.

19. A bi-currency debt contract system as recited in claim 18 further comprising a compensation package benefitting said debt issuer institution and including conversion fees from the client for exchanging local currency for the stable currency used for satisfaction of said amortization schedule.

20. A bi-currency debt contract system as recited in claim 19 wherein said compensation package further includes a deposit, of said reserve fund with said debt issuer institution.

21. A bi-currency debt contract system as recited in claim 18 further comprising a conversion debt package wherein said debt issuer institution converts preexisting debts involving local currency to debts of and payable in the stable currency.

22. A bi-currency debt contract system for making a stable currency debt for use in a secondary economy, said bi-currency debt contract system comprising:

a) a debt issuer entity having access to a stable currency, b) a debtor entity having use for debt proceeds in a secondary economy, c) a first interest rate at least partially determined from an available debt interest rate database of the stable currency, d) a second interest rate at least partially determined by from an available interest rate database of a local currency within the secondary economy, e) an agreement for a debt between said debt issuer and debtor entities at said first interest rate, said debt payable to and satisfied by said debtor entity in said stable currency, f) a processor assembly structured to generate an amortization schedule to satisfy said debt, said amortization schedule comprising a first debt service obligation payable at said second interest rate and a second debt service obligation payable at said first interest rate, and g) a reserve fund sufficient in amount to facilitate payment of at least a portion of said amortization schedule in the event of instability of said secondary economy.

23. A bi-currency debt contract system as recited in claim 22 wherein any unused portion of said reserve fund is returned to said debtor entity upon satisfaction of said debt.

24. A bi-currency debt contract system as recited in claim 23 wherein the amount of said reserve fund is predetermined based at least partially on the amount of said debt and the stability of the secondary economy.

25. A bi-currency debt contract system as recited in claim 24 wherein said reserve fund is derived from the difference in amortization of said debt at said second and first interest rates, said second interest rate being greater than said first interest rate.

26. A bi-currency debt contract system as recited in claim 25 wherein said reserve fund is accumulated in a predetermined number of periodic payments of said first debt service obligation.

27. A bi-currency debt contract system as recited in claim 26 wherein said second debt service obligation begins upon the satisfaction of said first debt service obligation and said reserve fund reaching said predetermined amount.

28. A procedure for issuing a secure, stable currency debt for use in a secondary economy, said procedure comprising:

a) establishing a first interest rate at least partially based on an available debt interest rate database of a predetermined stable currency, b) establishing a second interest rate at least partially based on an available debt interest rate database of a local currency of a secondary economy, c) making a debt in the stable currency between a debt issuer entity and a debtor entity at the first interest rate, d) establishing a processor generated amortization schedule and amortizing at least a portion of the debt at the second interest rate and another portion of the debt at the first interest rate in accord with the processor generated amortization schedule, and e) creating a reserve fund derived from the difference in the amortization of the debt at the second interest rate and the first interest rate.

29. A procedure as recited in claim 28 comprising establishing the reserve fund in a sufficient amount to facilitate satisfaction of the debt in the event of a period of instability of the secondary economy.

30. A procedure as recited in claim 29 comprising determining the amount of said reserve fund based at least partially on the amount of the debt and the stability of the secondary economy.

31. A procedure as recited in claim 28 comprising establishing the reserve fund by accumulating a portion of periodic payments made in amortizing the debt at the second interest rate.

32. A procedure as recited in claim 31 comprising continuing periodic payments to satisfy amortizing the debt at the second interest rate for a predetermined length of time until the reserve fund comprises the predetermined amount.

33. Procedure as recited in claim 32 comprising returning any unused portion of the reserve fund to the debtor entity upon satisfaction of the debt.

34. A procedure as recited in claim 28 comprising returning any unused portion of said reserve fund to the debtor entity upon satisfaction of the debt.

35. A procedure as recited in claim 34 comprising associating the debt issuer entity with a debt issuer institution associated with the secondary economy and extending the debt to a client of the debt issuer institution as the debtor entity.

36. A procedure as recited in claim 35 comprising compensating the debt issuer institution by conversion fees from the client, charged by the debt issuer institution for exchanging local currency for the stable currency used for the satisfaction of the debt.

37. A procedure as recited in claim 28 comprising converting pre-existing debts of local currency into debts of and payable in the stable currency.

38. A procedure for making a secure debt comprising:
   a) establishing a first interest rate at least partially based on an available first debt interest rate database,
   b) establishing a second interest rate which is greater than the first interest rate based on an available second debt interest rate database,
   c) making a debt between a debt issuer entity and a debtor entity at the first interest rate,
   d) establishing a processor generated amortization schedule and amortizing at least a majority of the debt at the second interest rate in accord with the processor generated amortization schedule,
   e) creating a reserve fund derived from the difference in amortization of the debt at the second interest rate and at the first interest rate, and
   f) establishing the reserve fund in a predetermined sufficient amount to facilitate satisfaction of the debt.

39. A procedure as recited in claim 38 comprising amortizing another portion of the debt at the first interest rate, and returning the amount of the reserve fund to the debtor entity at a predetermined time before or after satisfaction of the debt.

40. A procedure as recited in claim 38 comprising returning the amount of the reserve fund to the debtor entity at a predetermined time before or after the satisfaction of the debt.

* * * * *